United States Patent
Powell et al.

(10) Patent No.: US 9,892,529 B2
(45) Date of Patent: Feb. 13, 2018

(54) CONSTRAINT EVALUATION IN DIRECTED ACYCLIC GRAPHS

(71) Applicant: DreamWorks Animation LLC, Glendale, CA (US)

(72) Inventors: Alexander P. Powell, Los Angeles, CA (US); Esteban D. Papp, Los Angeles, CA (US); Alex M. Wells, Tigard, OR (US)

(73) Assignee: DreamWorks Animation L.L.C., Universal City, CA (US)

( * ) Notice: Subject to any disclaimer, the term of this patent is extended or adjusted under 35 U.S.C. 154(b) by 746 days.

(21) Appl. No.: 13/958,523

(22) Filed: Aug. 2, 2013

(65) Prior Publication Data

US 2014/0035908 A1    Feb. 6, 2014

Related U.S. Application Data

(60) Provisional application No. 61/679,665, filed on Aug. 3, 2012.

(51) Int. Cl.
*G06T 15/00* (2011.01)
*G06F 3/00* (2006.01)
(Continued)

(52) U.S. Cl.
CPC ............... *G06T 11/20* (2013.01); *G06F 3/00* (2013.01); *G06T 13/20* (2013.01); *G06T 19/20* (2013.01); *G06T 2219/2016* (2013.01)

(58) Field of Classification Search
CPC . G06F 3/00; G06F 3/048; G06F 8/423; G06F 17/30958; G06F 21/62;
(Continued)

(56) References Cited

U.S. PATENT DOCUMENTS 6,990,230 B2 * 1/2006 Piponi ........................... 382/154
7,676,356 B2 * 3/2010 Carmel .................. G06T 19/00
703/21

(Continued)

FOREIGN PATENT DOCUMENTS

CN        102103519 A      6/2011

OTHER PUBLICATIONS

International Search Report and Written Opinion received for PCT Patent Application No. PCT/US2013/53520, dated Dec. 20, 2013, 8 pages.

(Continued)

*Primary Examiner* — Gregory J Tryder
*Assistant Examiner* — Kwang Lee
(74) *Attorney, Agent, or Firm* — Dentons US LLP

(57) ABSTRACT

Systems and processes are described below relating to evaluating a dependency graph to render three-dimensional (3D) graphics using constraints. Two virtual 3D objects are accessed in a virtual 3D space. A constraint relationship request is received, which identifies the first object as a parent and the second object as a child. The technique verifies whether the graphs of the objects are compatible for being constrained to one another. The first object is evaluated to determine its translation, rotation, and scale. The second object is similarly evaluated based on the translation, rotation, and scale of the first object. An image is rendered depicting at least a portion of the first virtual 3D object and at least a portion of the second virtual 3D object.

24 Claims, 6 Drawing Sheets
(2 of 6 Drawing Sheet(s) Filed in Color)

(51) Int. Cl.
*G06T 11/20* (2006.01)
*G06T 13/20* (2011.01)
*G06T 19/20* (2011.01)

(58) Field of Classification Search
CPC ....... G06T 15/20; G06T 17/00; G06T 15/005; G06T 19/00; G06T 2210/21; G06T 2219/024; G06K 9/00704; G06K 9/342; G08G 5/045; G07F 7/00; H04W 4/206
USPC .......................................................... 345/419
See application file for complete search history.

(56) References Cited

U.S. PATENT DOCUMENTS

| | | |
|---|---|---|
| 2002/0032697 A1 | 3/2002 | French et al. |
| 2004/0085311 A1 | 5/2004 | Lee et al. |
| 2005/0248563 A1 | 11/2005 | Grassia et al. |
| 2007/0185946 A1 | 8/2007 | Basri et al. |
| 2007/0198971 A1 | 8/2007 | Dasu et al. |
| 2010/0134501 A1* | 6/2010 | Lowe et al. ................. 345/474 |
| 2010/0201682 A1 | 8/2010 | Quan et al. |
| 2012/0019535 A1* | 1/2012 | Miyashita ............. G06T 11/206 345/440 |
| 2012/0113125 A1* | 5/2012 | Guerrab et al. ............. 345/473 |

OTHER PUBLICATIONS

Janssen et al., "A Specification Invariant Technique for Regularity Improvement Between Flow-Graph Clusters" Proceedings of the European Design and Test Conference, 1996, pp. 138-143.

International Preliminary Report on Patentability received for PCT Patent Application No. PCT/US2013/053520, dated Feb. 12, 2015, 7 pages.

Extended European Search received for European Patent Application No. 13825848.3, dated Jan. 5, 2016, 3 pages.

Office Action received for Chinese Patent Application No. 201380008985.6, dated Feb. 28, 2017, 18 pages (10 pages of English Translation and 8 pages of official copy).

* cited by examiner

CONSTRAINT EVALUATION IN DIRECTED ACYCLIC GRAPHS

CROSS-REFERENCE TO RELATED APPLICATIONS

This application claims priority to U.S. Provisional Application No. 61/679,665 filed with the U.S. Patent and Trademark Office on Aug. 3, 2012, the entire contents of which are hereby incorporated by reference.

BACKGROUND

1. Field

The present disclosure relates to the manipulation of virtual three-dimensional (3D) objects, and, in one particular example, to constraining virtual 3D objects to each other in virtual 3D space using directed acyclic graphs (DAGs).

2. Related Art

Scenes in animated media productions typically include multiple objects, such as characters or assets. To provide realism, the objects are manipulated to appear to interact with each other in a similar fashion as in the real world. For example, a scene may include a protagonist character moving or otherwise manipulating a prop asset, such as a sword. To achieve this effect, an animator user may manually move the handle of the sword frame-by-frame in virtual three-dimensional (3D) space along with the movement of the character's hand during production. After the images are rendered, the sword appears to move with the movement of the character's hand in the animation.

Media productions typically use graphs to render, animate, or otherwise describe a scene in an animation. Directed acyclic graphs (DAGs) may be used to represent characters and assets. Graphs can include a system of interconnected nodes that perform computations on input data, such as input attributes, and produce output data, such as output attributes. By varying the animation controls that feed into the inputs of an object, an animator user can control the motion, location, and other visual effects of the object.

As media productions create more realistic animations, the complexity and the number of nodes in the graphs used to support these animations also increase. For example, the graph describing a character may become larger and more complex as the character is enhanced to include visual elements and movements that are more realistic. To create a visually appealing animation, it is helpful to produce animated interactions among the complex characters and between characters and props in a realistic manner. Accordingly, an optimized technique for manipulating characters and assets using constraints is described.

SUMMARY

Processes for evaluating a dependency graph to render three-dimensional (3D) graphics using constraints are described. In one example, a first directed acyclic graph (DAG) representing a first virtual 3D object is accessed. A second DAG representing a second virtual 3D object is also accessed. A constraint relationship request is received. The constraint relationship request identifies the first DAG as a constraint parent and the second DAG as a constraint child. It is verified whether the first DAG is compatible for constraining to the second DAG. In response to the first DAG and second DAG being compatible for constraining, an output of the first DAG is connected to an input of the second DAG. The first DAG is evaluated to determine a first output value at the output of the first DAG. In response to determining that the first output value affects the evaluation of the second DAG, the second DAG is evaluated based on the first output value received at the input of the second DAG from the output of the first DAG. After determining that the evaluation of the first DAG and second DAG is complete, an image is rendered depicting at least a portion of the first virtual 3D object and at least a portion of the second virtual 3D object.

In a further example, evaluating the second DAG based on the first output value comprises evaluating the second DAG using a manipulation value based on at least one of the translation, rotation, or scale associated with the first DAG.

In another example, the process also receives a further constraint relationship request. The further constraint relationship request identifying the second DAG as a constraint parent and the first DAG as a constraint child. Evaluating the second DAG produces a second output value. The second output value is produced at the output of the second DAG. In response to determining that the second output value affects the evaluation of the first DAG, the first DAG is evaluated based on the second output value received at an input of the first DAG from the output of the second DAG.

In another example, the second DAG is being evaluated based on the first output value comprises evaluating the second DAG using a manipulation value based on the translation, rotation, or scale associated with the first DAG. Similarly, evaluating the first DAG based on the second output value comprises evaluating the first DAG using a manipulation value based on at least one of the translation, rotation, or scale associated with the second DAG.

BRIEF DESCRIPTION OF THE FIGURES

The patent or application file contains at least one drawing executed in color. Copies of this patent or patent application publication with color drawing(s) will be provided by the Office upon request and payment of the necessary fee.

The present application can be best understood by reference to the following description taken in conjunction with the accompanying drawing figures, in which like parts may be referred to by like numerals.

DETAILED DESCRIPTION

The following description is presented to enable a person of ordinary skill in the art to make and use the various embodiments. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the present technology. Thus, the disclosed technology is not intended to be limited to the examples described herein and shown, but is to be accorded the scope consistent with the claims.

Various embodiments are described below relating to processes for using a constraint system to manipulate virtual three-dimensional (3D) objects in a virtual 3D space. For example, two 3D objects may be constrained to one another in virtual 3D space such that they move, rotate, and scale together. This may create the appearance that the two objects are virtually attached to one another.

Figure 1A:
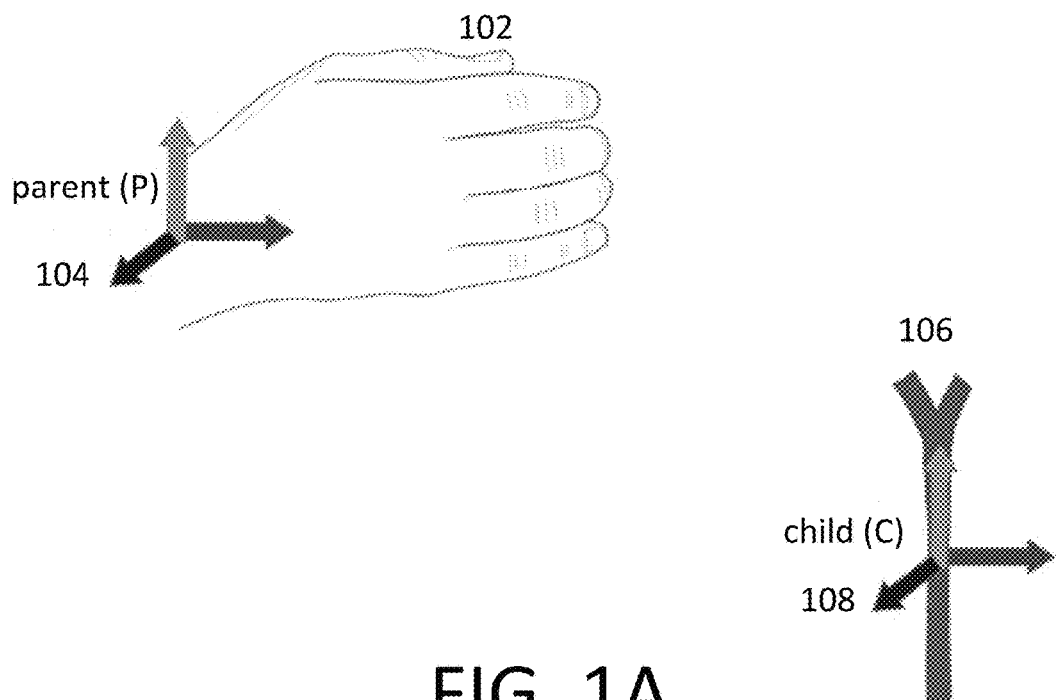
FIGS. 1A and 1B illustrate exemplary depictions of a virtual character's hand and a virtual tree branch prop asset.
Figure 1B:
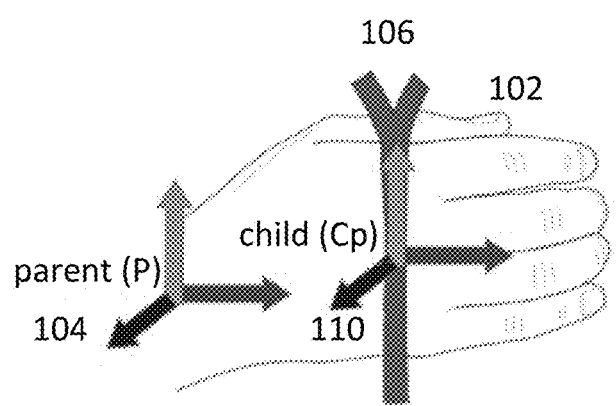

FIGS. 1A and 1B illustrate exemplary depictions of a virtual character's hand 102 and a virtual tree branch prop asset 106. Each of the hand 102 and the prop 106 has its own manipulation space. Hand 102 is associated with parent space 104. An object manipulator acting on hand 102 manipulates hand 102 with respect to parent space 104. Thus, values fed into the manipulators of hand 102 are interpreted with respect to the parent space 104. Exemplary manipulations include translation, rotation, and scale.

Prop 106 is associated with child space 108. An object manipulator acting on prop 106 manipulates prop 106 with respect to child space 108. Thus, values fed into the manipulators of prop 106 are interpreted with respect to the child space 108. Exemplary manipulations include translation, rotation, and scale.

The manipulation spaces of hand 102 and prop 106 in FIG. 1A are identified as being a parent and a child manipulation space, respectively, for consistency with FIG. 1B. When prop 106 is not constrained to hand 102, there is no parent/child constraint relationship between prop 106 and hand 102. Instead, hand 102 and prop 106 may be manipulated independent of each other. When hand 102 and prop 106 are not constrained to one another, it is cumbersome for an animator user to make it appear as though prop 106 is being held by hand 102 over a duration of time or over multiple frames. Notably, the animator user may need to manually manipulate the translation, rotation, or scale of prop 106 as the translation, rotation, or scale of hand 102 changes. This provides the appearance that the hand 102 is holding the prop 106, but is cumbersome, inaccurate, and time-consuming.

Instead, an animator user may constrain prop 106 to hand 102. By identifying prop 106 as a child of the parent hand 102, prop 106 will be configured to automatically move with hand 102 as hand 102 is manipulated in 3D space. In the example of FIG. 1B, two significant changes have been made in relation to the objects as originally depicted in FIG. 1A. First, the translation of prop 106 has changed in 3D space to make prop 106 appear to be placed in hand 102. Second, prop 106 has been constrained to hand 102. This constraint has been configured such that hand 102 is the parent and prop 106 is the child.

By constraining prop 106 to hand 102, one or more of the translation, rotation, and scale characteristics of prop 106 will be based on the translation, rotation, and scale of hand 102. Accordingly, the manipulation space of prop 106 changes to manipulation space 110. Manipulation space 110 is dependent on the manipulation of the parent object to which it is constrained, hand 102 in this example.

Figure 2:
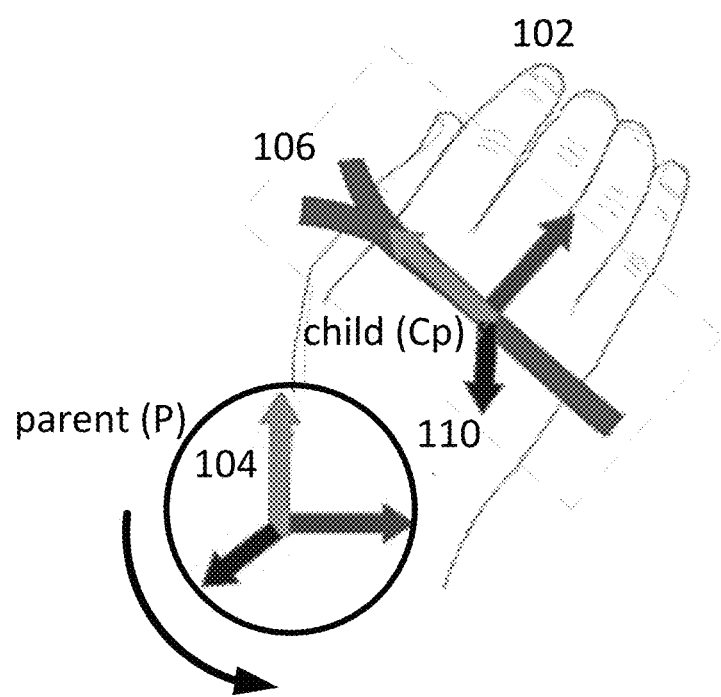
FIG. 2 illustrates an exemplary prop asset constrained to a hand, which has been rotated.

In FIG. 2, hand 102 has been rotated counter-clockwise by approximately 45 degrees. Note that while the parent space remains unchanged, the child space is now based on the rotation applied to hand 102. Rotating hand 102 has caused prop 106 to move along with hand 102 because prop 106 is constrained to hand 102. Hand 102 (the parent object) is driving prop 106 (the child object).

Prop 106 may be further manipulated in manipulation space 110. For example, the translation, rotation, and scale of prop 106 may be modified. However, these modifications will be applied in addition to the manipulations of hand 102 inherited by prop 106. In one example, prop 106 may be rotated while prop 106 is constrained to hand 102. Under this circumstance, any manipulation of hand 102 would cause the prop 106 to move along with the manipulation of hand 102. Any additional manipulation of prop 106, however, would not necessarily cause a change in the characteristics of hand 102.

Importantly, constraining one virtual object to another virtual object does not necessarily require that the two objects appear to be touching, as in the examples discussed above. In contrast, objects may be constrained to one another in many ways. In one example, two objects may be constrained to each other based on translation, rotation, and scale, but not be touching. This may be desirable, for example, when a ball is depicted to magically float over the open hand of a superhero character to indicate the superhero is controlling the location of the ball through supernatural means without touching the ball.

In another example, an aim constraint may be applied between virtual objects. An aim constraint causes a child object in a scene to rotate in order to track the movement of a parent object. For example, the eyeballs of a character may be constrained to a ball object. As the ball object bounces on a virtual floor in 3D space, the eyeballs of the character follow the movement of the ball object. This effect may be achieved by defining a first vector in 3D space that is associated with the left eye of the character and defining a second vector in 3D space that is associated with the right eye of the character. For example, the first vector is positioned to be normal to the iris of the left eye while the second vector is positioned to be normal to the iris of the right eye. An aim constraint of the left eye to the ball causes the left eye to rotate such that the first vector continuously points to the ball. An aim constraint of the right eye to the ball causes the right eye to rotate such that the second vector continuously points to the ball. As is apparent by this example, multiple objects may be constrained as children to a single parent object.

Similarly, an object may be constrained to multiple parent objects. In one example, the constrained child object may be constrained to one parent object based on a translation constraint, while constrained to a different object based on an aim constraint. This may be used, for example, when a virtual compass pointing north is placed into the hand of a character. The compass moves with the hand because the translation of the compass is constrained to the hand. However, the needle of the compass continuously points to a virtual north location based on the aim constraint.

In another example, a spring constraint may be applied between virtual objects. The child of a spring constraint may adopt a percentage of the translation, rotation, or scale of the parent. This allows the child object to be partially manipulated along with the parent object. Examples where this may be used are when a virtual character is riding on the back of a virtual animal. A bounce-like effect makes it appear that the virtual character is on the virtual animal, but not directly attached to the virtual animal.

Figure 3:
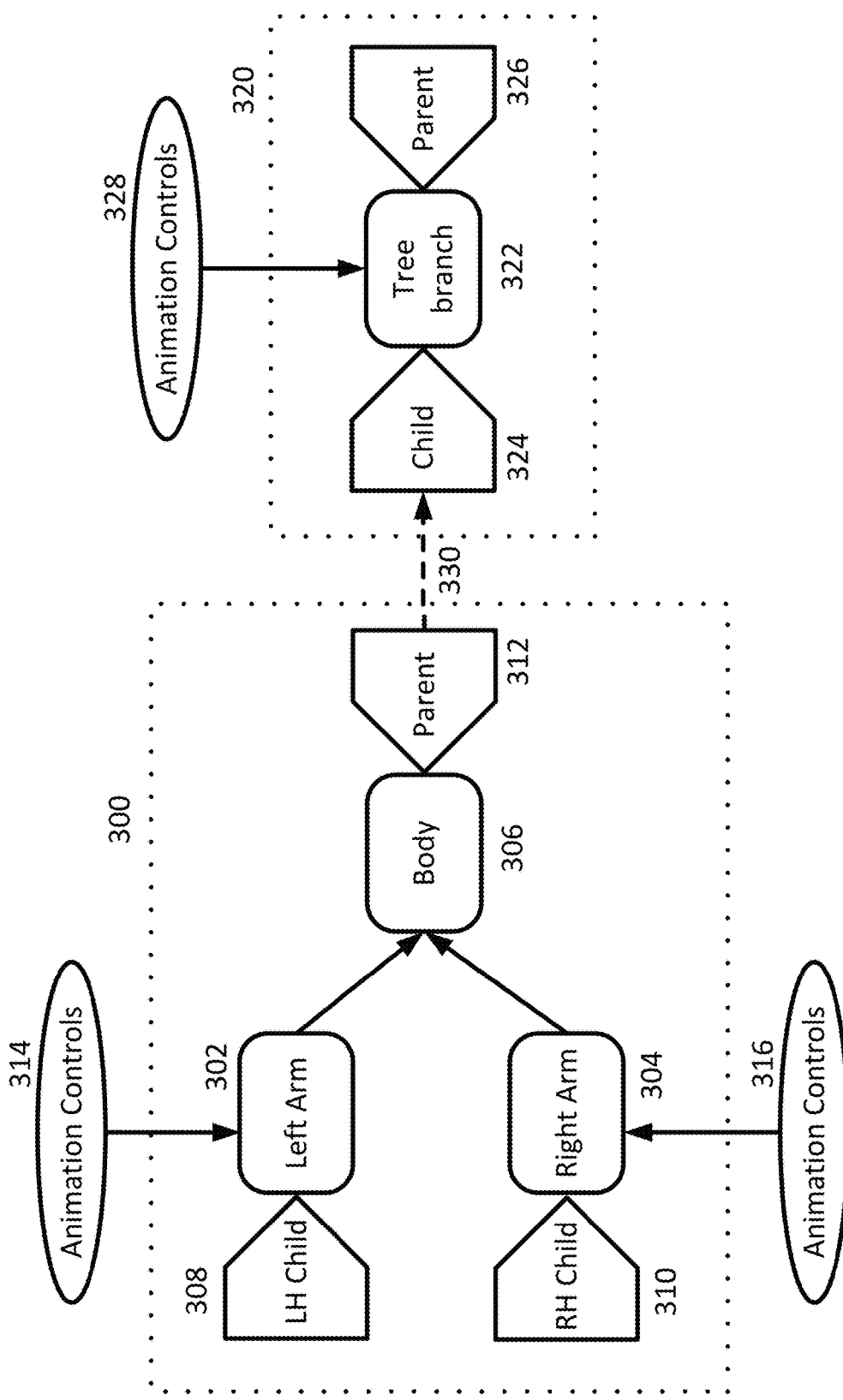
FIG. 3 illustrates an exemplary acyclic constraint relationship between an animation character and a tree branch prop asset.

FIG. 3 illustrates an exemplary acyclic constraint relationship between an animation character and a tree branch prop asset. The directed acyclic graph (DAG) of the character 300 and the DAG of the tree branch prop asset 320 are simplified to better illustrate the constraint relationship 330 between the character and the tree branch prop. In this example, the constraint relationship 330 is implemented at a level higher than the character DAG 300 and the prop DAG 320.

In FIG. 3, an instance of the DAG of character 300 comprises nodes 302-312. The character DAG 300 takes as input animation controls 314 and 316, which may specify characteristics such as the translation, rotation, and scale of the character's left arm and right arm components. For example, input animation controls 314 may specify characteristics indicating that the left hand of the character should be placed at a specific location in 3D space while input animation controls 316 may specify that the right hand of the character should be placed at a different location in 3D space in conjunction with a specified rotation.

Node 302 represents the left arm of the character, node 304 represents the right arm of the character, and node 306 represents the body of the character. Left hand child node 308 is a child constraint node and is configured to accept one or more inputs, though no input is connected in this example. Right hand child node 310 is also a child constraint node and is configured to accept one or more inputs, though no input is connected in this example.

Parent node 312 is a parent constraint node and is configured to output data for driving a child object. The tree branch prop, represented by an instance of the prop DAG 320, is a child object. The prop DAG 320 comprises nodes 322-324. As the character DAG 300 receives data in the form of animation controls, the character associated with character DAG 300 is manipulated. The constraint relationship 330 causes the prop DAG to be manipulated in accordance with the manipulations of the character.

For example, if constraint relationship 330 indicates that the tree branch prop is constrained to the right hand of the character, the tree branch prop's translation, rotation, and scale will be based on one or more of the translation, rotation, and scale of the character's right hand. In this example, the manipulation space of prop DAG 320 is aligned with the manipulation space of the right hand of the character DAG 300. Any corresponding translation, rotation, and scale applied to the right hand of character prop DAG 320 by animation control 316 also acts on the tree branch prop. Further, any translation, rotation, and scale applied to the prop DAG 320 by animation control 328 is additionally applied to the tree branch prop.

Figure 4:
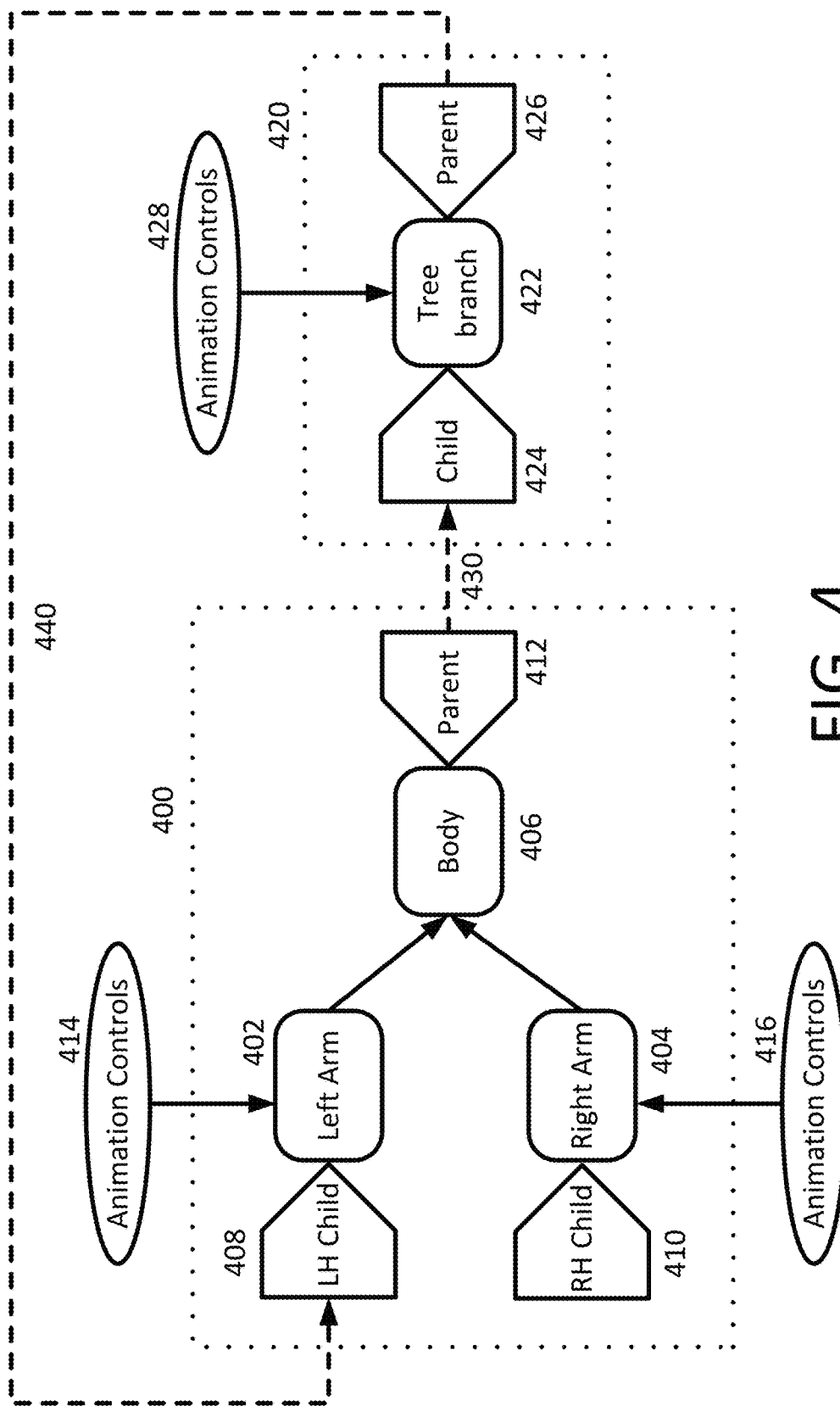
FIG. 4 illustrates an exemplary cyclic constraint relationship between an animation character and a tree branch prop asset.

FIG. 4 illustrates an exemplary cyclic constraint relationship between an animation character and a tree branch prop asset. The directed acyclic graph (DAG) of the character 400 and the DAG of the tree branch prop asset 420 are simplified to better illustrate the constraint relationships 430 and 440 between the character and the tree branch prop.

In this example, the constraint relationships 430 and 440 are implemented at a level higher than the character DAG 400 and the prop DAG 420. Although the constraint relationship is cyclic, maintaining acyclic DAGs for the character and the prop has several benefits. Maintaining acyclic DAGs for the character and the prop allows for a more straightforward approach to creating an evaluation plan for each of the character and the prop. From an organizational perspective, each character or prop has its own independent graph. A constraint relationship is configured at the level of an animation shot by associating virtual objects, such as characters and props. As an example, although it may be desirable to constrain a tree branch to the hand of a character for the duration of a particular animation shot, it may not necessarily be true that an animator user wants the tree branch to be constrained to the character's hand for the entire duration of the media production.

FIG. 4 illustrates a cyclic relationship because an output of character DAG 400 drives an input of prop DAG 420 and an output of prop DAG 420 drives an input of character DAG 400. In particular, parent node 412 feeds into child node 424 via constraint relationship 430 and parent node 426 feeds into left hand child node 408 via constraint relationship 440. This may be indicative, for example, of the tree branch being constrained to the right hand of the character, and the left hand of the character being constrained to the tree branch. As a result of the right hand of the character being manipulated (such as through translation, rotation, or scale) by an animator user, the manipulation of the right hand of the character drives the manipulation of the tree branch, and the manipulation of the tree branch drives the manipulation of the left hand of the character.

In the example where constraint relationship 430 indicates that the tree branch prop (child) is constrained to the right hand of the character (parent), the tree branch prop's translation, rotation, and scale will be based on one or more of the translation, rotation, and scale of the character's right hand. In this example, the manipulation space of prop DAG 420 is aligned with the manipulation space of the right hand of the character DAG 400. Any corresponding translation, rotation, and scale applied to the right hand of character DAG 400 by animation control 416 also acts on the tree branch prop. Further, any translation, rotation, and scale applied to the prop DAG 320 by animation control 328 is additionally applied to the tree branch prop.

Continuing the example, where the constraint relationship 440 indicates that the left hand of the character (child) is constrained to the tree branch prop (parent), the character's left hand's translation, rotation, and scale will be based on one or more of the translation, rotation, and scale of the tree branch prop. The manipulation space of the left hand of the character DAG 400 is aligned with the manipulation space of the prop DAG 420, which as discussed above has been aligned with the manipulation space of the right hand of the character DAG 400. Any corresponding translation, rotation, and scale applied to the tree branch prop DAG 420 by animation control 428 also acts on the character's left hand. Further, any translation, rotation, and scale applied to the left hand of the character DAG 320 by animation control 414 is additionally applied to the character's left hand.

Implementation of such a cyclic constraint introduces the potential for differing results based on the order of evaluation of the objects in the scene. Several different strategies may be used to alleviate this limitation. In one example, an execution list may be received by the animation system that identifies the order in which objects in a scene should be evaluated using their associated constraints. An animator user may specify that the character DAG 400 should be evaluated first, followed by the prop DAG 420, and followed again by the character DAG 400. This removes the potential for infinite loops. In another example, the high-level cyclic graph associated with the constraints may be used to repeatedly evaluate objects that include a parent or child constraint node. The system receives an indication from an animator user that identifies a starting object in the scene. The system then repeatedly follows the flow of the constraints from parent to child, evaluating the DAGs. The system may stop the evaluations after the system reaches equilibrium or after the system cycles through the associated DAGs a determined number of iterations. It should be appreciated that the techniques for determining the order of evaluation can also apply to constraint systems that are acyclic as well as systems that are cyclic.

In one embodiment, each parent constraint node and child constraint node is assigned a class type. The class types determine compatibility between the constraint nodes. For example, the animation system may permit a parent constraint node of a first class type to be attached to a child constraint node of the first class type. However, the animation system may disallow a parent constraint node of a first class type from being attached to a child constraint node of a second class type. Such class types are helpful for limiting constraint connections to only between constraint nodes that include compatible constraint interfaces.

Figure 5:
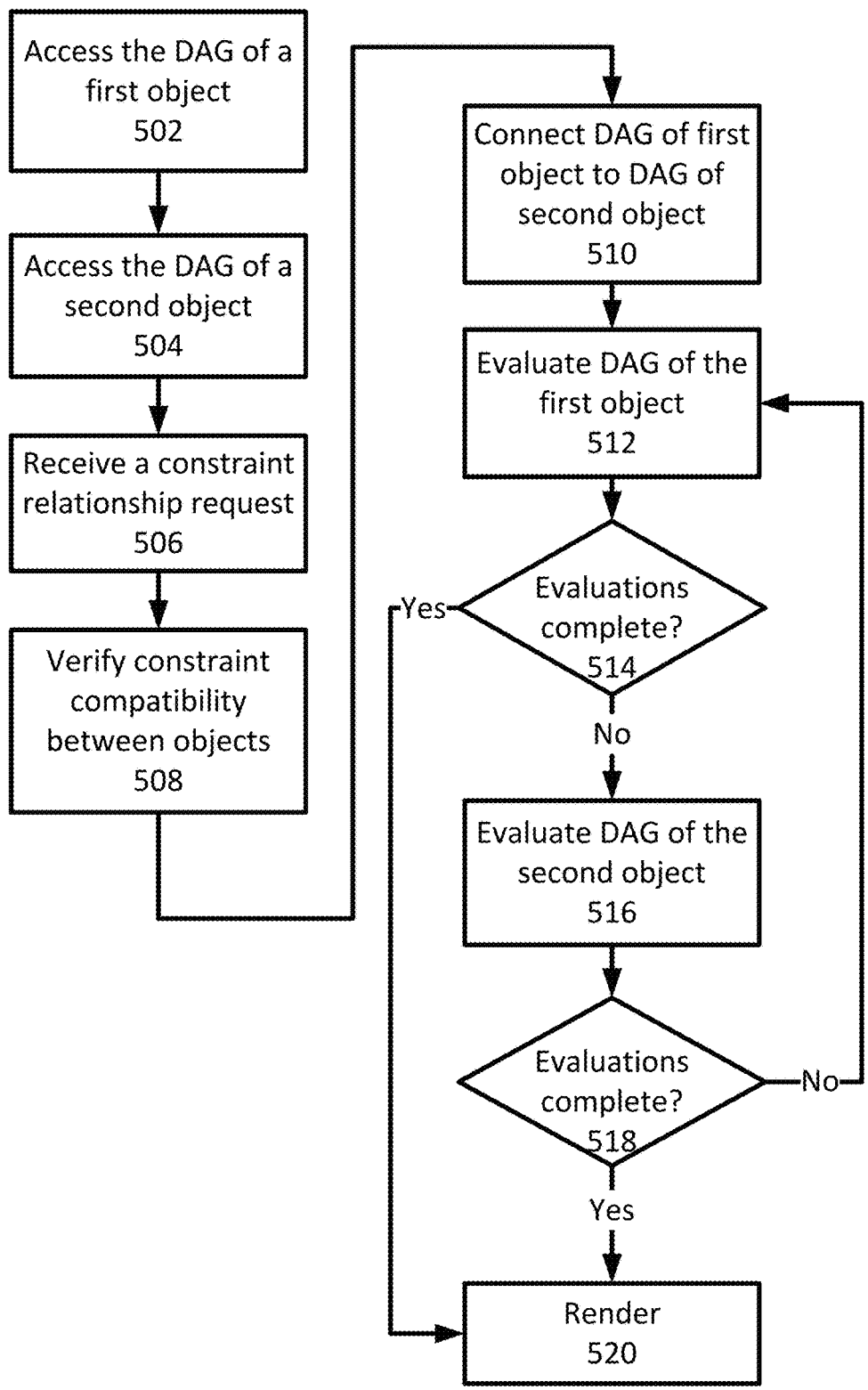
FIG. 5 describes an exemplary process for evaluating constraint relationships between the DAGs of two virtual 3D objects.

FIG. 5 describes an exemplary process for evaluating constraint relationships between the DAGs of two virtual 3D objects. At block 502, the animation system accesses a first directed acyclic graph (DAG) representing a first virtual 3D object. The first virtual 3D object may be, for example, a character, a prop, or any other virtual 3D object. In block 504, the animation system accesses a second DAG representing a second virtual 3D object. The second virtual 3D object may be, for example, another character or prop.

At block 506, the animation system receives a constraint relationship request. The constraint relationship request identifies the first DAG as a constraint parent and the second DAG as a constraint child. This constraint relationship determines that values from the first DAG will be driving the second DAG. At block 508, the animation system verifies whether the first DAG is compatible for being constrained to the second DAG. For example, the animation system may determine that the two DAGs are not compatible if the constraint interface associated with the first DAG delivers data in a format that is incompatible with the constraint interface for receiving data associated with the second DAG.

At block 510, the animation system connects an output of the first DAG to an input of the second DAG if it determines that the first DAG and the second DAG are compatible for being constrained to one another. If the system determines that the two DAGs are incompatible for being constrained to one another, the system may issue an error.

At block 512, the animation system evaluates the DAG of the first object. Evaluation of a DAG may comprise, for example, evaluating one or more nodes of the DAG or simply determining that cached values for the DAG exists. When cached values for the DAG exist, there may be no need to reevaluate the nodes of the DAG. The DAG of the first object may have been selected for evaluation before the DAG of the second object based on an execution list or other user input. At block 514, the animation system determines if the evaluation of the DAG of the first object will affect the evaluation of the DAG of the second object. This may be done, for example, using dirty flags. If the DAG of the second object is not affected, the system may render one or more images for display.

At block 516, the animation system evaluates the DAG of the second object. As discussed above, the evaluation of a DAG may comprise, for example, evaluating one or more nodes of the DAG or simply determining that cached values for the DAG exists. When cached values for the DAG exist, there may be no need to reevaluate the nodes of the DAG. The evaluation of the DAG of the second object is based on a result of the evaluation of the DAG of the first object. For example, if the second object is constrained to the first object with respect to translation, rotation, and scale, then the translation, rotation, and scale of the first object will affect the evaluation of the second object.

The joints of virtual objects, such as the joints of characters, can have several manipulable parameters (or degrees of freedom), which may be constrained to other objects. As virtual objects are manipulated in virtual 3D space, the objects appear to be animated. This animation may be the result of Forward kinematics (FK) and Inverse kinematics (IK).

FK can define what the exact location and/or rotation of each appendage joint should be. FK can generally be used to set a particular pose of the appendage. Inverse kinematics IK can define a goal or destination of the appendage, e.g., the appendage should touch another object, and then calculate the location and/or rotation required for each appendage joint to reach that goal or destination. IK can generally be used to set a particular goal for the appendage.

Search-based matching can be used to search for a match between one set of parameters and another set by making incremental adjustment to the one set until it matches the other. As such, when a switch is made between FK and IK, the two sets of parameters match, thereby eliminating any abrupt changes during the switch. Search-based matching is described in greater detail in U.S. patent application Ser. No. 13/843,600, the entire contents of which are hereby incorporated by reference.

At block 518, the animation system determines whether the evaluations of the first DAG and second DAG are complete. This block may be useful, for example, if the constraints introduced into the system are cyclic. The animation system may determine that the evaluations are complete using different techniques. For example, the animation system may determine that the evaluations are complete when the system reaches equilibrium or when a determined number of evaluation iterations have been performed. As with certain other blocks, this block may be omitted in certain embodiments. For example, this block may be omitted in embodiments where the constraint relationships are not cyclic. Under that circumstance, block 520 may directly proceed block 516.

At block 510, the animation system renders an image depicting at least a portion of the first virtual 3D object and at least a portion of the second virtual 3D object. In some examples, the animation system may render multiple images, which illustrate motion or movement of the objects.

Figure 6:
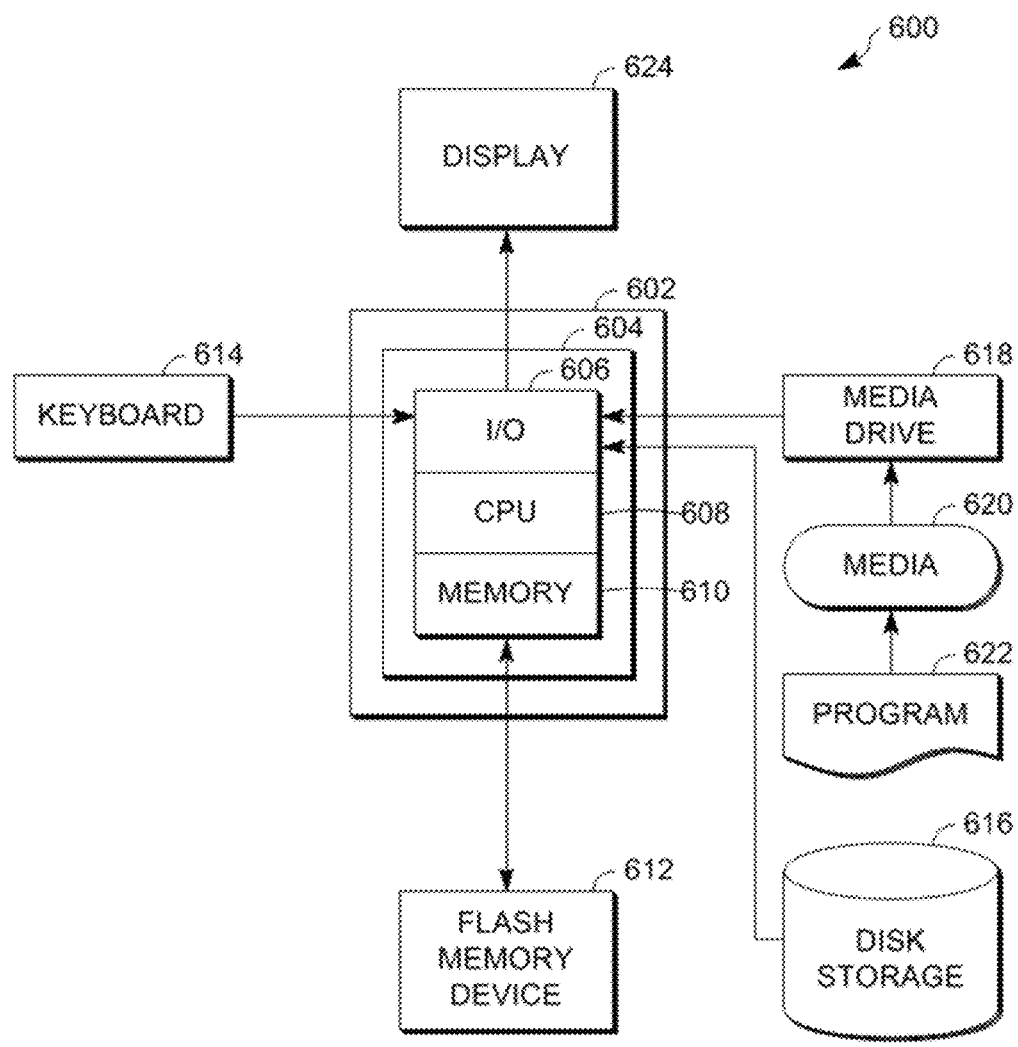
FIG. 6 depicts an exemplary animation computing system.

FIG. 6 depicts an exemplary animation computing system 600 configured to perform any one of the above-described processes. In this context, computing system 600 may include, for example, a processor, memory, storage, and input/output devices (e.g., monitor, keyboard, touch screen, disk drive, Internet connection, etc.). However, computing system 600 may include circuitry or other specialized hardware for carrying out some or all aspects of the processes. In some operational settings, computing system 600 may be configured as a system that includes one or more units, each of which is configured to carry out some aspects of the processes either in software, hardware, or some combination thereof.

FIG. 6 depicts computing system 600 with a number of components that may be used to perform the above-described processes. The main system 602 includes a motherboard 604 having an input/output ("I/O") section 606, one or more central processing units ("CPU") 608, and a memory section 610, which may have a flash memory device 612 related to it. The I/O section 606 is connected to a display 624, a keyboard 614, a disk storage unit 616, and a media drive unit 618. The media drive unit 618 can read/write a computer-readable medium 620, which can contain programs 622 and/or data. The I/O section 606 may also connect to cloud storage using, for example, cellular data communications or wireless local area network communications.

At least some values based on the results of the above-described processes can be saved for subsequent use. Additionally, a non-transitory computer-readable medium can be used to store (e.g., tangibly embody) one or more computer programs for performing any one of the above-described processes by means of a computer. The computer program may be written, for example, in a general-purpose programming language (e.g., Perl, C, C++, Java) or some specialized application-specific language.

Various exemplary embodiments are described herein. Reference is made to these examples in a non-limiting sense. They are provided to illustrate more broadly applicable aspects of the disclosed technology. Various changes may be made and equivalents may be substituted without departing from the true spirit and scope of the various embodiments. In addition, many modifications may be made to adapt a particular situation, material, composition of matter, process, process act(s) or step(s) to the objective(s), spirit or scope of the various embodiments. Further, as will be appreciated by those with skill in the art that each of the individual variations described and illustrated herein has discrete components and features which may be readily separated from or combined with the features of any of the other several embodiments without departing from the scope or spirit of the various embodiments.

What is claimed is:

1. A method for evaluating a constraint system for use in rendering three-dimensional (3D) graphics, the method comprising:
   accessing a first directed acyclic graph (DAG) representing a first virtual 3D object;
   accessing a second DAG representing a second virtual 3D object;
   receiving a constraint relationship request, the constraint relationship request identifying the first DAG as a constraint parent and the second DAG as a constraint child;
   verifying whether the first DAG is compatible for constraining to the second DAG;
   connecting, in response to the first DAG and second DAG being compatible for constraining, an output of the first DAG to an input of the second DAG;
   evaluating the first DAG to determine a first output value at the output of the first DAG;
   evaluating, in response to determining that the first output value affects the evaluation of the second DAG, the second DAG based on the first output value received at the input of the second DAG from the output of the first DAG; and
   rendering, after determining that the evaluation of the first DAG and second DAG is complete, an image depicting at least a portion of the first virtual 3D object and at least a portion of the second virtual 3D object.

2. The method of claim 1, wherein evaluating the second DAG based on the first output value comprises evaluating the second DAG using a manipulation value based on at least one of the translation, rotation, or scale associated with the first DAG.

3. The method of claim 1, further comprising
   receiving a further constraint relationship request, the further constraint relationship request identifying the second DAG as a constraint parent and the first DAG as a constraint child;
   wherein evaluating the second DAG produces a second output value, the second output value at the output of the second DAG; and
   evaluating, in response to determining that the second output value affects the evaluation of the first DAG, the first DAG based on the second output value received at an input of the first DAG from the output of the second DAG.

4. The method of claim 1, wherein:
   evaluating the second DAG based on the first output value comprises evaluating the second DAG using a manipulation value based on the translation, rotation, or scale associated with the first DAG; and
   evaluating the first DAG based on the second output value comprises evaluating the first DAG using a manipulation value based on at least one of the translation, rotation, or scale associated with the second DAG.

5. The method of claim 1, wherein verifying whether the first DAG is compatible for constraining to the second DAG comprises verifying that a first constraint interface of the output of first DAG is compatible with a second constraint interface of the input of the second DAG.

6. The method of claim 5, wherein:
   the first DAG comprises a first child constraint node having an input with the first constraint interface and a first parent constraint node having an output with the second constraint interface; and
   the second DAG comprises a second child constraint node having an input with the first constraint interface and a second parent constraint node having an output with the second constraint interface.

7. The method of claim 1, wherein the constraint relationship request identifies one or more of a translation/rotation/scale constraint relationship or an aim constraint relationship.

8. The method of claim 7, wherein the aim constraint relationship uses an identified axis of the second virtual 3D object.

9. A non-transitory computer-readable storage medium comprising computer-executable instructions for evaluating a constraint system for use in rendering three-dimensional (3D) graphics, the computer-executable instructions comprising instructions for:
   accessing a first directed acyclic graph (DAG) representing a first virtual 3D object;
   accessing a second DAG representing a second virtual 3D object;
   receiving a constraint relationship request, the constraint relationship request identifying the first DAG as a constraint parent and the second DAG as a constraint child;
   verifying whether the first DAG is compatible for constraining to the second DAG;
   connecting, in response to the first DAG and second DAG being compatible for constraining, an output of the first DAG to an input of the second DAG;
   evaluating the first DAG to determine a first output value at the output of the first DAG;
   evaluating, in response to determining that the first output value affects the evaluation of the second DAG, the second DAG based on the first output value received at the input of the second DAG from the output of the first DAG; and
   rendering, after determining that the evaluation of the first DAG and second DAG is complete, an image depicting at least a portion of the first virtual 3D object and at least a portion of the second virtual 3D object.

10. The non-transitory computer-readable storage medium of claim 9, wherein evaluating the second DAG based on the first output value comprises evaluating the second DAG using a manipulation value based on at least one of the translation, rotation, or scale associated with the first DAG.

11. The non-transitory computer-readable storage medium of claim 9, further comprising instructions for:
receiving a further constraint relationship request, the further constraint relationship request identifying the second DAG as a constraint parent and the first DAG as a constraint child;
wherein evaluating the second DAG produces a second output value, the second output value at the output of the second DAG; and
evaluating, in response to determining that the second output value affects the evaluation of the first DAG, the first DAG based on the second output value received at an input of the first DAG from the output of the second DAG.

12. The non-transitory computer-readable storage medium of claim 9, wherein:
evaluating the second DAG based on the first output value comprises evaluating the second DAG using a manipulation value based on the translation, rotation, or scale associated with the first DAG; and
evaluating the first DAG based on the second output value comprises evaluating the first DAG using a manipulation value based on at least one of the translation, rotation, or scale associated with the second DAG.

13. The non-transitory computer-readable storage medium of claim 9, wherein verifying whether the first DAG is compatible for constraining to the second DAG comprises verifying that a first constraint interface of the output of first DAG is compatible with a second constraint interface of the input of the second DAG.

14. The non-transitory computer-readable storage medium of claim 13, wherein:
the first DAG comprises a first child constraint node having an input with the first constraint interface and a first parent constraint node having an output with the second constraint interface; and
the second DAG comprises a second child constraint node having an input with the first constraint interface and a second parent constraint node having an output with the second constraint interface.

15. The non-transitory computer-readable storage medium of claim 9, wherein the constraint relationship request identifies one or more of a translation/rotation/scale constraint relationship or an aim constraint relationship.

16. The non-transitory computer-readable storage medium of claim 15, wherein the aim constraint relationship uses an identified axis of the second virtual 3D object.

17. An apparatus for evaluating a constraint system for use in rendering three-dimensional (3D) graphics, the apparatus comprising:
a memory configured to store:
a first directed acyclic graph (DAG) representing a first virtual 3D object; and
a second DAG representing a second virtual 3D object
a computer processor configured to:
access the first directed acyclic graph (DAG) representing a first virtual 3D object;
access the second DAG representing a second virtual 3D object;
receive a constraint relationship request, the constraint relationship request identifying the first DAG as a constraint parent and the second DAG as a constraint child;
verify whether the first DAG is compatible for constraining to the second DAG;
connect, in response to the first DAG and second DAG being compatible for constraining, an output of the first DAG to an input of the second DAG;
evaluate the first DAG to determine a first output value at the output of the first DAG;
evaluate, in response to determining that the first output value affects the evaluation of the second DAG, the second DAG based on the first output value received at the input of the second DAG from the output of the first DAG; and
render, after determining that the evaluation of the first DAG and second DAG is complete, an image depicting at least a portion of the first virtual 3D object and at least a portion of the second virtual 3D object.

18. The apparatus of claim 17, wherein evaluating the second DAG based on the first output value comprises evaluating the second DAG using a manipulation value based on at least one of the translation, rotation, or scale associated with the first DAG.

19. The apparatus of claim 17, the computer process further configured to:
receive a further constraint relationship request, the further constraint relationship request identifying the second DAG as a constraint parent and the first DAG as a constraint child;
wherein evaluating the second DAG produces a second output value, the second output value at the output of the second DAG; and
evaluate, in response to determining that the second output value affects the evaluation of the first DAG, the first DAG based on the second output value received at an input of the first DAG from the output of the second DAG.

20. The apparatus of claim 17, wherein:
evaluating the second DAG based on the first output value comprises evaluating the second DAG using a manipulation value based on the translation, rotation, or scale associated with the first DAG; and
evaluating the first DAG based on the second output value comprises evaluating the first DAG using a manipulation value based on at least one of the translation, rotation, or scale associated with the second DAG.

21. The apparatus of claim 17, wherein verifying whether the first DAG is compatible for constraining to the second DAG comprises verifying that a first constraint interface of the output of first DAG is compatible with a second constraint interface of the input of the second DAG.

22. The apparatus of claim 21, wherein:
the first DAG comprises a first child constraint node having an input with the first constraint interface and a first parent constraint node having an output with the second constraint interface; and
the second DAG comprises a second child constraint node having an input with the first constraint interface and a second parent constraint node having an output with the second constraint interface.

23. The apparatus of claim 17, wherein the constraint relationship request identifies one or more of a translation/rotation/scale constraint relationship or an aim constraint relationship.

24. The apparatus of claim 23, wherein the aim constraint relationship uses an identified axis of the second virtual 3D object.

\* \* \* \* \*